United States Patent [19]

Yoshida

[11] Patent Number: 5,659,401
[45] Date of Patent: Aug. 19, 1997

[54] FACSIMILE APPARATUS AND METHOD USING ENERGY SUPPLIED THROUGH A TELEPHONE LINE FOR OPERATION THEREOF

[75] Inventor: Takehiro Yoshida, Tokyo, Japan

[73] Assignee: Canon Kabushiki Kaisha, Tokyo, Japan

[21] Appl. No.: 748,972

[22] Filed: Nov. 13, 1996

Related U.S. Application Data

[63] Continuation of Ser. No. 338,779, Nov. 10, 1994, abandoned.

[30] Foreign Application Priority Data

Nov. 12, 1993 [JP] Japan .................................. 5-307356
Sep. 19, 1994 [JP] Japan .................................. 6-223202

[51] Int. Cl.$^6$ ........................................... H04N 1/32
[52] U.S. Cl. ....................... 358/442; 358/400; 358/406
[58] Field of Search ................................ 358/400, 404, 358/406, 442, 444, 468; 348/730; 379/100; H04N 1/32, 1/00

[56] References Cited

U.S. PATENT DOCUMENTS

| 4,567,328 | 1/1986 | Carasco et al. ........................ 179/100 |
|---|---|---|
| 5,046,136 | 9/1991 | Tokunaga et al. . |
| 5,146,493 | 9/1992 | Kiguchi et al. . |
| 5,182,655 | 1/1993 | Motoyanagi ............................. 358/400 |
| 5,194,968 | 3/1993 | Nakajima et al. ....................... 358/400 |
| 5,251,043 | 10/1993 | Hamano et al. ........................ 358/444 |
| 5,282,054 | 1/1994 | Oana et al. ............................. 358/468 |
| 5,315,403 | 5/1994 | Hirai et al. .............................. 358/404 |
| 5,392,023 | 2/1995 | D'Avello et al. ....................... 358/400 |
| 5,475,500 | 12/1995 | Takeda .................................... 358/468 |
| 5,497,245 | 3/1996 | Uchida .................................... 358/406 |

FOREIGN PATENT DOCUMENTS 5-236169   9/1993   Japan .

*Primary Examiner*—Kim Vu
*Attorney, Agent, or Firm*—Fitzpatrick, Cella, Harper & Scinto

[57] ABSTRACT

A facsimile apparatus transmits picture information stored in a transmitting-end memory circuit to an opposite station and stores picture information received from the opposite station in a receiving-end memory circuit. The transmitting and storing operations are conducted by using small electric energy supplied from a telephone circuit to which the facsimile apparatus is connected, thus realizing an efficient use of energy.

20 Claims, 13 Drawing Sheets

5,659,401

FACSIMILE APPARATUS AND METHOD USING ENERGY SUPPLIED THROUGH A TELEPHONE LINE FOR OPERATION THEREOF

This application is a continuation of application Ser. No. 08/338,779, filed Nov. 19, 1994, now abandoned.

BACKGROUND OF THE INVENTION

1. Field of the Invention

The present invention relates to a facsimile apparatus and, more particularly, to a facsimile apparatus which performs transmitting and receiving operations by using energy derived from a telephone circuit.

2. Description of the Related Art

In general, a known facsimile apparatus essentially requires an A.C. power supply or batteries as an energy source even when it is designed to perform transmitting and receiving operations with small electrical power.

Nowadays, electric and electronic parts of reduced power consumption have been developed so that facsimile apparatuses incorporating such parts or components can perform transmitting and receiving operations with much reduced consumption of electrical power. Thus, a reconsideration is required as to the use of an A.C. power supply or a battery as the source of electrical power, since the use of such conventional power supply is one of the factors which raises the cost of production of facsimile apparatuses.

SUMMARY OF THE INVENTION

Accordingly, an object of the present invention is to provide a facsimile apparatus which can operate with a reduced power consumption.

Another object of the present invention is to provide a facsimile apparatus which can operate with electrical power derived from a telephone circuit, wherein supply of electrical power when the facsimile apparatus is in stand-by 10 condition is preserved by a specific means.

To these ends, according to one aspect of the present invention, there is provided a facsimile apparatus comprising: storage means for storing picture information; and control means for enabling operation for transmitting picture information stored in the storage means to an opposite station and operation for storing picture information from the opposite station in the storage means to be conducted by energy supplied from a telephone circuit to which the facsimile apparatus is connected.

According to another aspect of the invention, there is provided a facsimile apparatus which performs various controls and operations by using energy supplied from a solar battery, energy supplied through a telephone circuit and energy supplied from an external A.C. power supply, the facsimile apparatus comprising control means for controlling the supply of energy in such a manner that detection of pressing down a key on the facsimile apparatus in stand-by condition is conducted by using the energy supplied by the solar battery, detection of a call signal arriving at the facsimile apparatus in stand-by condition is conducted by using the energy supplied from the telephone circuit, transmission of information stored in a memory and storage of received information in the memory are conducted by using the energy supplied from the telephone circuit, and reading of an original and recording of received information are conducted by using energy supplied from an external A.C. power supply.

The above and other objects, features and advantages of the present invention will become clear from the following description when the same is read in conjunction with the accompanying drawings.

DESCRIPTION OF THE PREFERRED EMBODIMENTS

A first embodiment of the present invention will now be described with reference to the accompanying drawings, in particular to FIGS. 1 through 7.

Figure 1:
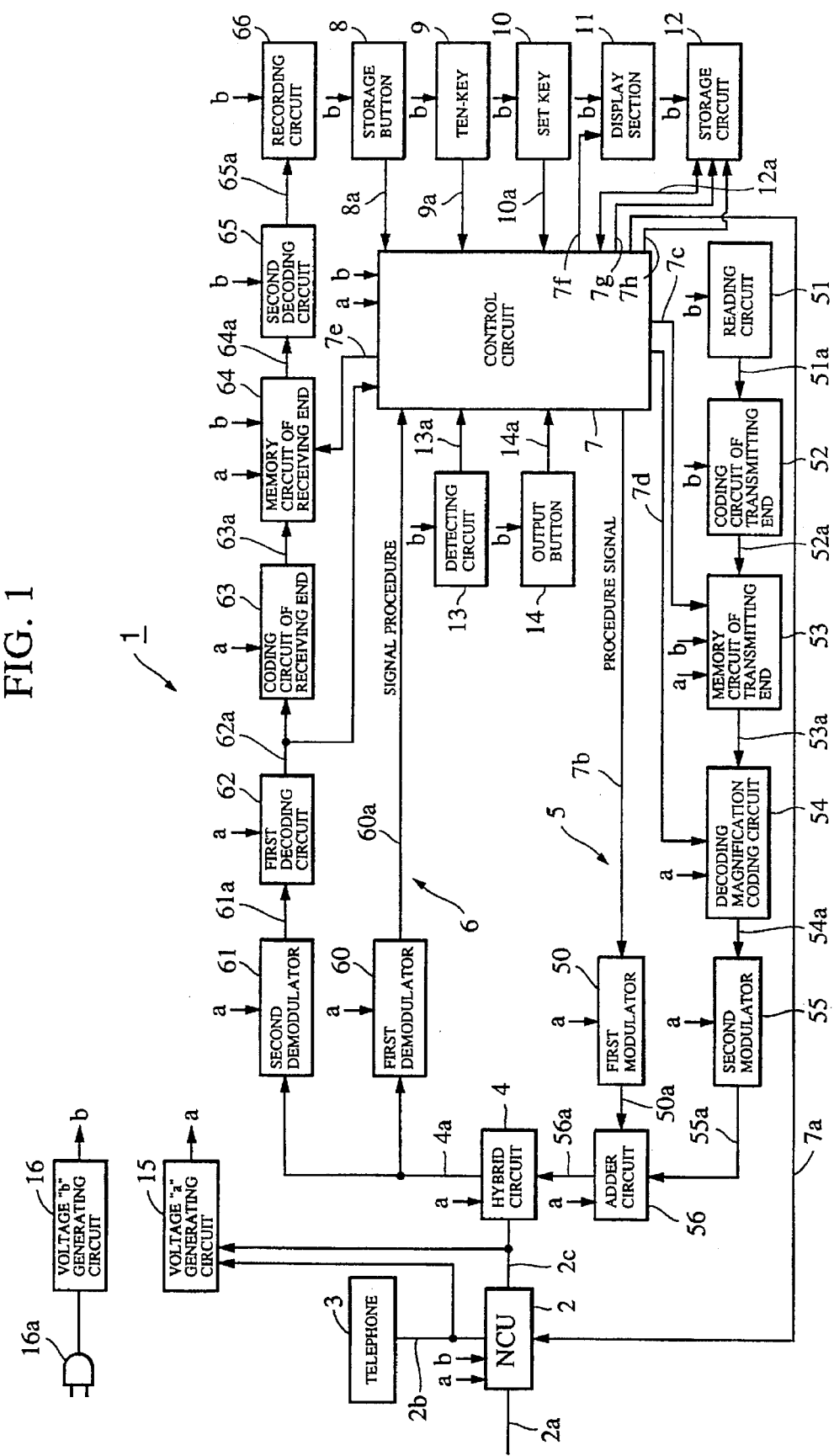
FIG. 1 is a block diagram of an embodiment of a facsimile apparatus in accordance with the present invention.

FIG. 1 is a block diagram showing the construction of a first embodiment of the facsimile apparatus in accordance with the present invention.

As will be seen from this Figure, the facsimile apparatus 1 is connected to a telephone circuit 2a through a network control unit (referred to as NCU, hereinafter) 2. A telephone 3 also is connected to the NCU 2.

The NCU 2 performs various operations to enable the telephone network to be used for purposes such as data communication, such as connection control of the telephone network, switching to the data communication line, holding of the loop and so forth. In the illustrated system, the NCU 2 operates under a later-mentioned control circuit 7 of the facsimile apparatus so as to connect the telephone circuit 2a either to the telephone 3 or to the facsimile apparatus 1. More specifically, the NCU 2 operates in response to a signal given through a signal line 7a of the facsimile apparatus 1, such that, when the signal level is "0", it connects to the telephone circuit 2a to the telephone 3, i.e., to a signal line 2b, whereas, when the level of the signal delivered through the signal line 7a is "1", it connects the telephone circuit 2a to the facsimile apparatus 1, i.e., to the signal line 2c. The normal state of the system, the telephone circuit 2a is connected to the telephone 3.

As will be seen from FIG. 1, the facsimile apparatus 1 includes a hybrid circuit 4 connected to the NCU 2, a transmission system 5 and a receiving system 6 which are connected to the hybrid circuit 4, the above-mentioned control circuit 7 which controls the NCU 2 and various portions of the control circuit 7, a memory button (registration means) 8 connected to the control circuit 7, a ten-key device 9, a set key 10, a display section 11, a storage circuit (registration means) 12, a detecting circuit (detecting means) 13 and an output button (output selecting means) 14, and a voltage "a" generating circuit 15 and a voltage "b" generating circuit 16 for supplying power to various portions of the facsimile apparatus 1.

The hybrid circuit 4 functions so as to separate signals on the transmission system 5 and the signals on the receiving system 6 from each other. More specifically, the hybrid circuit 4 delivers a transmission signal on a signal line of the transmission system 5 to the telephone circuit 2a via the NCU 2 through a signal line 2c, while receiving the signal transmitted from an opposite station through the telephone line 2a and delivers the same to a signal line 4a of the receiving system 6 via the NCU 2 through the signal line 2c.

The transmission system 5 includes the following components: a first modulator 50 which effects, on a procedure signal delivered from the signal line 7b of the control circuit 7, a modulation in accordance with ITU-T recommendation V21 which is known, and delivers the modulated signal to a signal line 50a; a reading circuit (reading means) 51 which has an imaging device such as CCD (Charge-Coupled device) and an optical system and which successively reads picture signals along one line of main scan on an original carrying picture data to be transmitted so as to form a series of binary signals corresponding to black and white and to deliver the binary signal train to a signal line 51a; a transmission-end coding circuit 52 which receives read data from the signal line 51a and effects MH coding (Modified Huffman coding) or MR coding (Modified Read coding) to deliver the coded signal to a signal line 52a; a transmission-end memory circuit (storage means) 53 which is a non-volatile memory such as a flash memory and which delivers coded data which has been stored therein to a signal line 53a in accordance with a control signal given through a signal line 7c; a decoding/magnifying/coding circuit 54 which operates in accordance with a signal supplied through a signal line 7d so as to receive data from the signal line 53a and to effect decoding, magnification changing and coding on the received data to deliver the coded data to a signal line 54a; a second modulator 55 which receives coded data from the signal line 54a and effects, on the received coded data, a modulation in accordance with known ITU-T recommendation V27 ter (Differential phase modulation) or V29 (orthogonal modulation) to deliver the modulated data to a signal line 55a; and an adder circuit 56 which receives signals from the signal line 50a and the signal line 55a and delivers the sum of these signals to a signal line 56a.

The receiver system 6 includes the following components: a first modulator 60 which receives signals from the signal line 4a and effects thereon a demodulation in accordance with ITU-T recommendation V21 which is known so as to deliver the demodulated data to a signal line 60a; a second demodulator 61 which receives signals from the signal line 4a and effects thereon a demodulation in accordance with known ITU-T recommendation V27 ter (differential phase modulation) or V29 (orthogonal modulation) so as to deliver the demodulated data to a signal line 61a; a first decoding circuit 62 which receives the signal from the signal line 61a and effects thereon MH decoding (Modified Huffman decoding) or MR decoding (Modified Read decoding) so as to deliver decoded data to a signal line 62a; a receiving-end coding circuit 63 which receives data from the signal line 62a and effects MR coding thereon with K=8, so as to deliver the coded data to a signal line 63a; a receiving-end memory circuit (recording means) 64 which is a non-volatile memory such as a flash memory and which stored the coded data from the signal line 63a in accordance with a control signal given by a signal line 7e and delivers the stored data to a signal line 64a under a control of a control signal given through the signal line 7e; a second decoding circuit 65 which receives signal from the signal line 64a and effects thereon MH decoding (Modified Huffman decoding) or MR (MOdified Read decoding) on the signals, so as to deliver the decoded data to a signal line 65a; and a recording circuit (recording means) 66 which receives data from the signal line 65a and records the same successively in a line-by-line fashion.

The recording button 8 is used for the purpose of registering, in the storage circuit 12, the time at which the received information stored in the receiving-end memory circuit 64 is to be recorded in a collective manner. A press-down pulse is generated on a signal line 8a when the button 8 is pressed down.

The ten-key device 9 is adapted to deliver to a signal line 9a any ten-key information produced in response to pressing down of a selected key or keys thereof.

The set key 10, when pressed down, delivers a press-down pulse to a signal line 10a.

The display section 11 is adapted for receiving and displaying data which has been delivered to the signal line 7f.

The storage circuit 12 registers the time at which the received information stored in the receiving-end memory circuit 64 is to be collectively recorded. For instance, there are 10 (ten) times for registration, from 0 to 9. For the purpose of registering the time of recording in the storage circuit 12, one of the numbers from 0 to 9, e.g., 1, indicative of the time of recording, a space, and a time, e.g., 20:00, at which the output is to be produced, are sequentially delivered to the signal line 12a, followed by generation of a write pulse on a signal line 7g. Conversely, for reading the information stored in the storage circuit 12, the recording time number, i.e., 1, is delivered to the signal line 12a, followed by generation of a read pulse on the signal line 7h, so that the time, i.e., 20:00, stored as the counterpart of the number 1, is delivered to the signal line 12a.

The detecting circuit 13 is capable of detecting that a user or operator has come near the facsimile apparatus 1. Namely, the detecting circuit 13 delivers, upon detection of approach of the user to the facsimile apparatus 1, a signal of level "1" to the signal line 13a, whereas, when no operator is near the facsimile apparatus 1, the detecting circuit delivers a signal of level "0" to the signal line 13a.

The output button 14 is used when it is desired to output the received information stored in the receiving-end memory circuit 64. The output button 14, when pressed down, produces a press-down pulse and delivers it to a signal line 14a.

The voltage "a" generating circuit 15 operates in accordance with signals derived from the signal lines 2b and 2c and generates a predetermined voltage "a" upon receipt of energy from the telephone circuit 2a. The circuit 15 delivers this voltage "a" to various components such as the NCU 2, hybrid circuit 4, control circuit 7, first modulator 50, transmission-end memory circuit 53, decoding/magnifying/cording circuit 54, second modulator 55, adder circuit 56, first modulator 60, second modulator 61, first decoding circuit 62, receiving-end coding circuit, receiving-end memory circuit 64 and s forth.

The voltage "b" generating circuit 16 generates a predetermined voltage "b" from A.C. electrical power input through a plug 16a for connection to commercial A.C. 100 V power supply, and delivers the voltage "b" to various components such as the NCU 2, control circuit 7, storage button 8, ten-key device 9, set key 10, display section 11, storage circuit 12, detecting circuit 13 and output button 14, reading circuit 51, transmission-end coding circuit 52, transmission-end memory circuit 53, receiving-end memory circuit 64, second decoding circuit 65, recording circuit 66 and so forth.

The control circuit 7 performs reading and recording of image or picture information by using the A.C. power. The picture information read by the reading circuit 51 is coded by the transmission end coding circuit 52 and is stored in the transmission-end memory circuit 53. When it is desired to transmit the picture information stored in the transmission-end memory circuit 53, CML is set on so as to put a D.C. circuit into effect, so that the picture information stored in the transmission-end memory circuit 53 is transmitted by energy which is derived from the telephone circuit 2a. Similarly, CML is set on when information sent from the opposite station is to be received, thus putting the D.C. circuit into use, so that the received information is stored in the receiving-end memory circuit 64 by energy which is derived from the telephone circuit 2a. After completion of storage of the received information in the receiving memory circuit 64, recording of the information on a recording paper is conducted by the recording circuit 66 which operates with the power derived from the A.C. power supply.

A description will now be given of the operation of the first embodiment with specific reference to FIGS. 2 and 3 which are flow charts illustrative of the flow of control process performed in the first embodiment.

Figure 2:
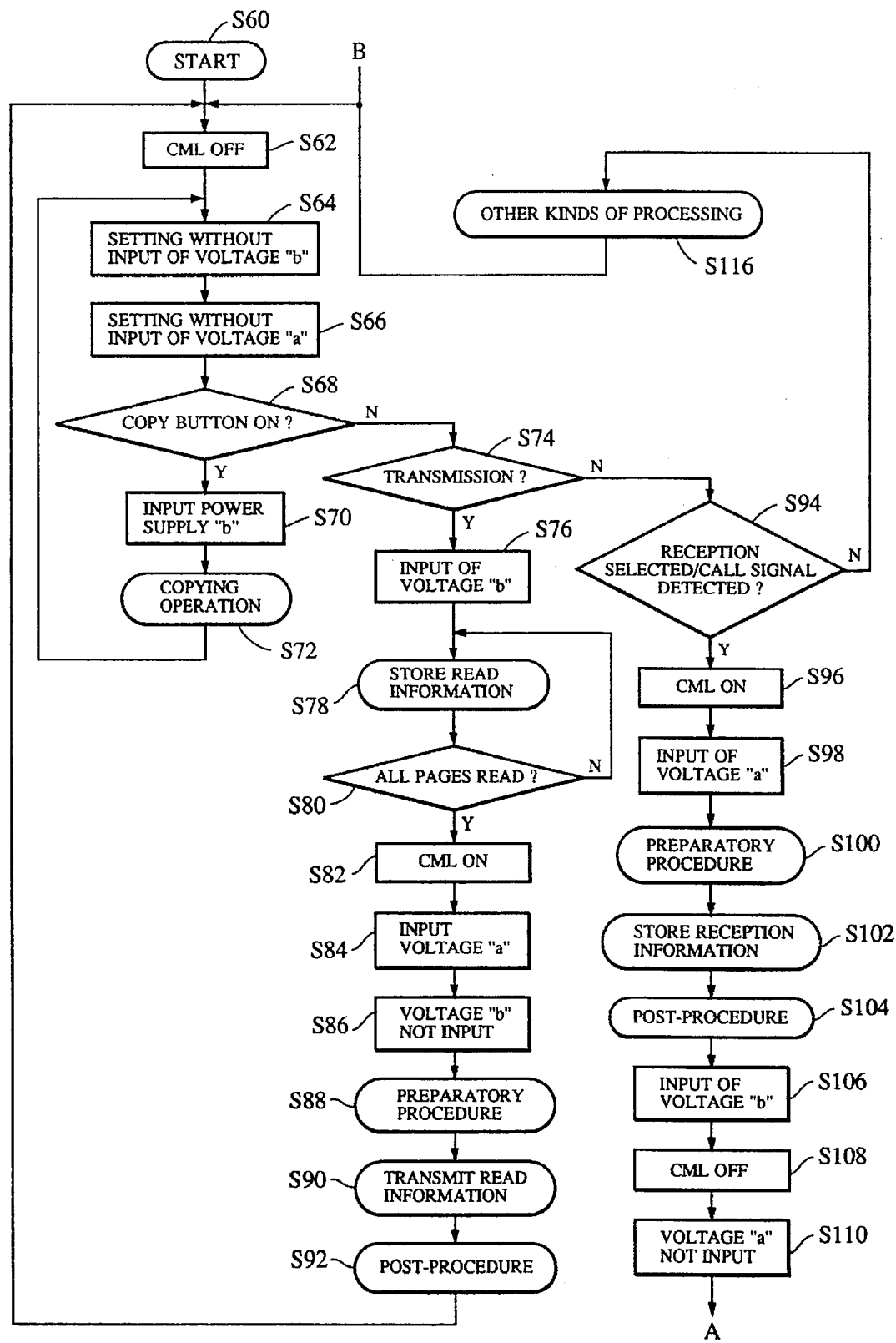
FIG. 2 is a flow chart illustrative of a control process performed in the first embodiment.
Figure 3:
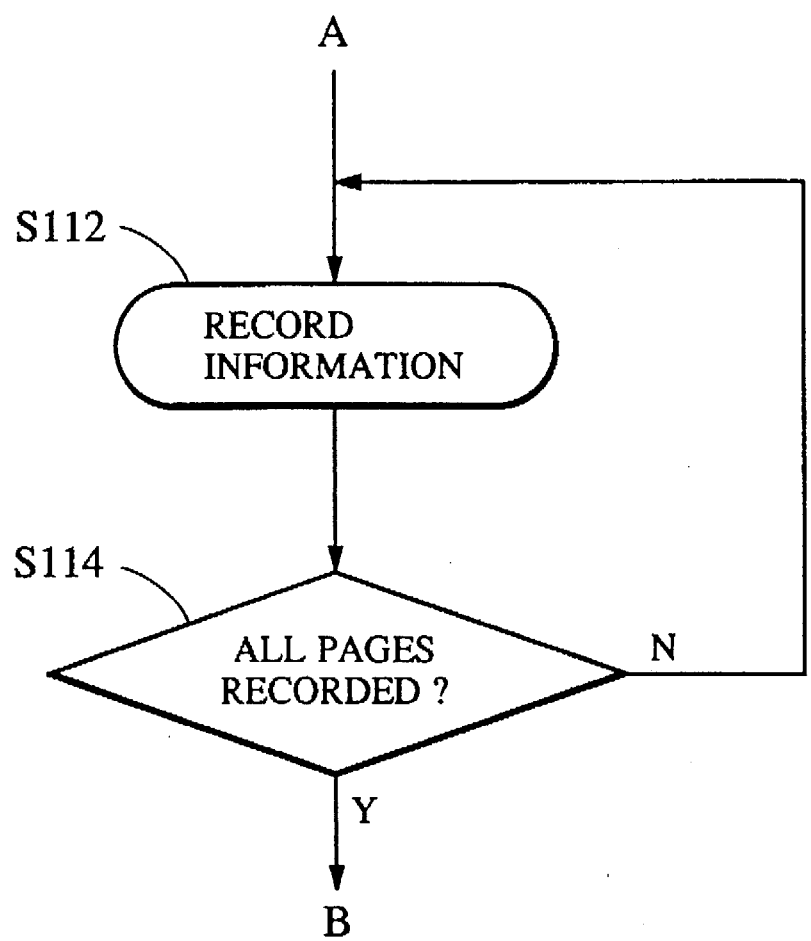
FIG. 3 is a flow chart illustrative of part of the control process shown in FIG. 2.

Referring to FIG. 2, the control process begins with Step S60. In step S62, the control circuit 7 delivers a signal of level "0" to the signal line 7a so as to turn the CML off. The NCU 2 receives the signal of "0" level from the facsimile apparatus 1 through the signal line 7a, so that it operates so as to connect the telephone circuit 2a to the telephone 3, i.e., to the signal line 2b. Since CML is turned off, the operation is set in Step S64 to a mode in which the voltage "b" generating circuit 16 is not used, i.e., a mode in which the predetermined voltage "b" from the A.C. power supply is not used. Then, setting is also done in Step S66 to a mode in which the voltage "a" generating circuit 15 is not used, i.e., a mode in which the predetermined voltage "a" formed from energy derived from the telephone circuit 2a is not used.

In Step S68, the control circuit 7 determines whether or not the copy button has been pressed down. If the answer is YES, the process proceeds to Step S70, whereas, if not, the process skips to Step S74.

In Step S70, the voltage "b" generating circuit 16 is operated, i.e., the predetermined voltage "b" from the A.C. power supply is inputted through a mechanical operation, so that the recording circuit 6 performs operation for recording information on a recording paper sheet, i.e. copying operation, in Step S72.

In Step S74, the control circuit 7 determines whether or not the transmitting operation has been selected. If the transmitting operation has been selected, the process proceeds to Step S76, whereas, when this operation has not been selected, the process skips to Step S94.

In Step S76, the voltage "b" generating circuit 16 is operated, i.e., the predetermined voltage "b" from the A.C. power supply is inputted through a mechanical operation. Then, the transmitting-end memory circuit 53 stores the read information in accordance with the control through the signal line 7c in Step S78.

In Step S80, the control circuit 7 determines whether or not all the pages have been read. If all the pages have been read, the process proceeds to Step S82. If reading of all the pages has not been completed, the process advances to Step S78.

In Step S82, the control circuit 7 delivers a signal of level "1" to the signal line 7a, so as to turn CML on, in Step S82. The NCU 2 receives the signal of level "1" from the facsimile apparatus 1 through the signal line 7a, so as to connect to the telephone circuit 2a to the facsimile apparatus 1, i . . . , to the signal line 2c. Since CML has been turned on, the operation is set in Step S84 to a mode which allows input of the predetermined voltage "a" produced by the voltage "a" generating circuit 15, i.e., the voltage formed from the energy supplied through the telephone circuit 2a. Then, in Step S86, the operation is set to a mode which prohibits the supply of the predetermined voltage "b" generated by the voltage "b" generating circuit, i.e., the voltage supplied through the A.C. power supply.

Then, a preparatory procedure is taken in Step S88 so as to preserve negotiation between the transmitting end and the receiving end, and the information which has been stored in the memory circuit 53 of the transmitting end is transmitted in Step S90, followed by a post-procedure which is taken in Step S92 for the purpose of confirming negotiation for opening of the circuit.

In Step S94, the control circuit 7 determines whether or not the receiving operation has been selected or whether or not a call signal has been detected. When the answer is affirmative, the process proceeds to Step S96, whereas, when the answer is not affirmative, the process proceeds to Step S116.

In Step S96, the control circuit 7 delivers a signal of level "1" to the signal line 7a, thereby turning CML on. In Step S98, since the CML has been turned on, the predetermined voltage "a" from the voltage "a" generating circuit 15, i.e., the voltage formed from energy supplied through the telephone circuit, is inputted, followed by Step S100 which executes the preparatory procedure. Then, in Step S102, the received information is stored in the receiving-end memory circuit 64, followed by Step S104 which executes post-procedure.

Then, Step S106 is conducted in which the predetermined voltage "b" generated by the voltage "b" generating circuit, i.e., the voltage formed from the power supplied by the A.C. power supply, is inputted. In Step S108, the control circuit 7 delivers a signal of level "0" to the signal line 7a and turns the CML off. In Step S110, since CML has been turned off, the operation is set to the mode which prohibits the inputting of the predetermined voltage "a" generated by the voltage "a" generating circuit 15, i.e., the voltage formed from energy supplied through the telephone circuit 2a. Then, the information which has been stored in the receiving-end memory circuit 64 is recorded in Step S112.

In Step S114, the control circuit 7 determines whether or not all the pages have been recorded. If the recording of all the pages has been finished, the process returns to Step S62, otherwise Step S116 is followed once again.

Figure 4:
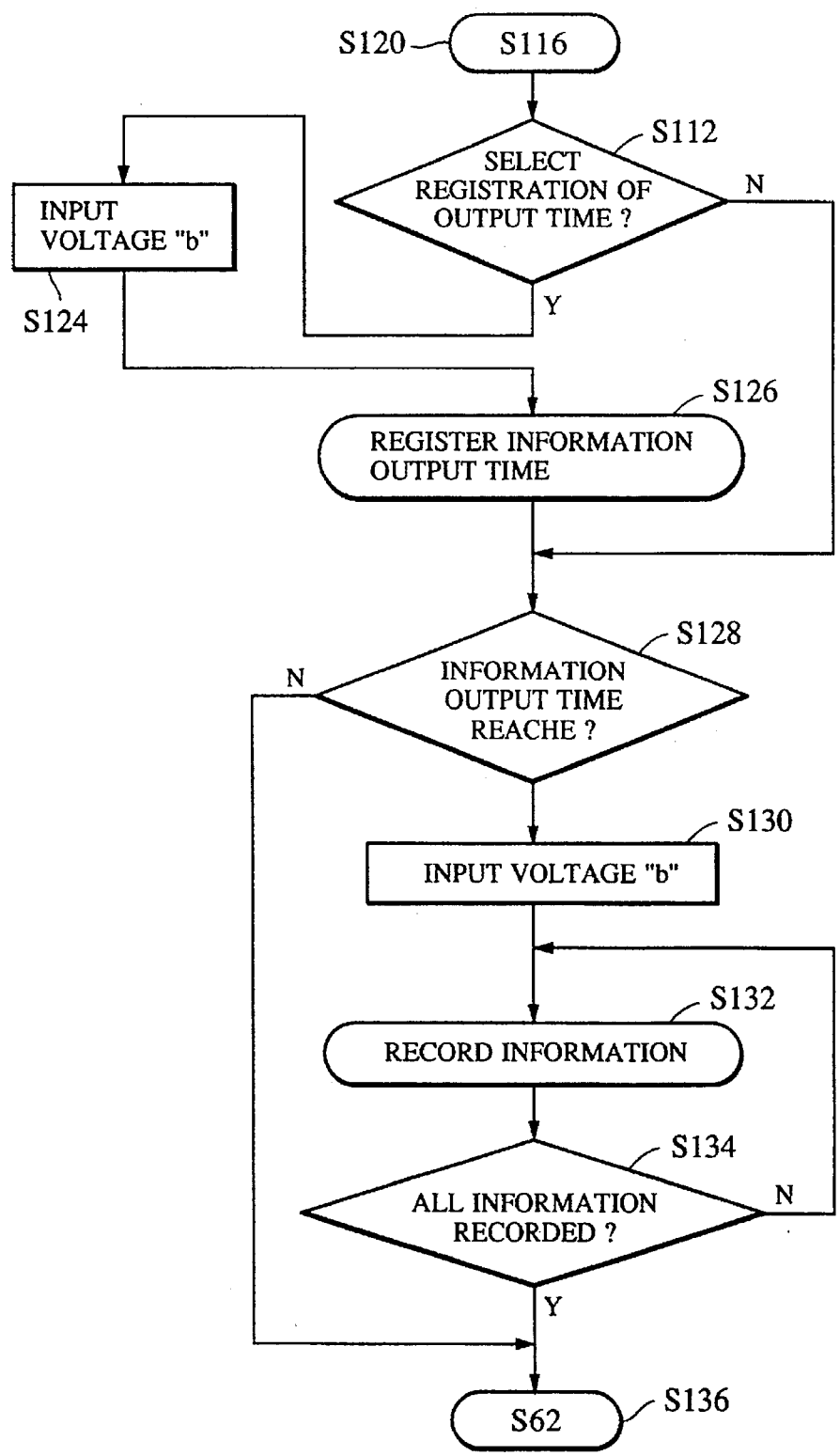
FIG. 4 is a flow chart illustrative of a control process performed in a second embodiment of the present invention.
Figure 5:
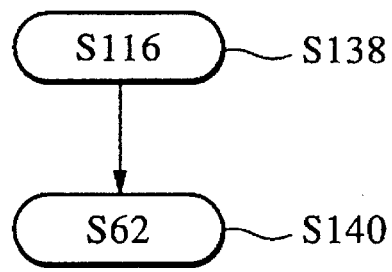
FIG. 5 is a flow chart illustrative of part of the control process shown in FIG. 4.

FIGS. 4 and 5 illustrates the flow of a process which is performed in a second embodiment of the present invention. More specifically, these Figures show portions of the process which are different from those of the process shown in FIGS. 2 and 3.

This embodiment is adapted to transmit the same information to a plurality of destinations. The transmission of the information stored in the transmitting-end memory circuit 53 to a plurality of destinations is conducted by energy supplied through the telephone circuit 2a, as in the case of the process explained before in connection with FIGS. 2 and 3. This modification also is capable of producing a plurality of sets of the output of the received information. The outputting, i.e., recording, of the plurality of sets of information is conducted by the power supplied through the A.C. power supply. In this modification, when the time for recording of the received information has been set in the storage circuit 12, all the picture information which has been received and stored in the receiving-ed memory circuit 64 is recorded by printing when the registered time is reached.

Step S120 shown in FIG. 4 corresponds to Step S116 in the flow shown in FIG. 2.

In Step S122, the control circuit 7 determines whether or not the registration of the time for outputting the received information stored in the transmitting-end memory circuit 53 has been selected. If the registration of the time has been selected, the process advances to Step S124, otherwise the process advances to Step S218.

In Step S124, the predetermined voltage "b" generated by the voltage "b" generating circuit 16, i.e., the voltage formed from the power supplied from the A.C. power supply, is inputted by mechanical operation. Then, the time for outputting the received information stored in the transmitting-end memory circuit 53 is registered in the storage circuit 12 in Step S126.

Then, Step S128 is executed in which the control circuit 7 conducts deformation whether or not the registered time has been reached for the outputting of the information stored in the transmitting-end memory circuit 53. Step S130 is executed if the registered time has been reached, otherwise the process proceeds to Step S136.

In Step S130, the predetermined voltage "b" generated by the voltage "b" generating circuit 16, i.e., the voltage produced from the power supplied from the A.C. power supply, is inputted by a mechanical operation. Then, the information stored in the receiving-end memory circuit 64 is recorded in Step S132.

In Step S134, the control circuit 7 determines whether or not all the information stored in the receiving-end memory circuit 64 has been recorded. If the answer is affirmative, the process proceeds to Step S136, otherwise the process returns to Step S132.

Step S136 shown in FIG. 4 corresponds to Step S62 of the flow shown in FIG. 2, while Steps S138 and S140 in FIG. 5 correspond to Steps S108 And S62 of the flow shown in FIG. 2, respectively.

Figure 6:
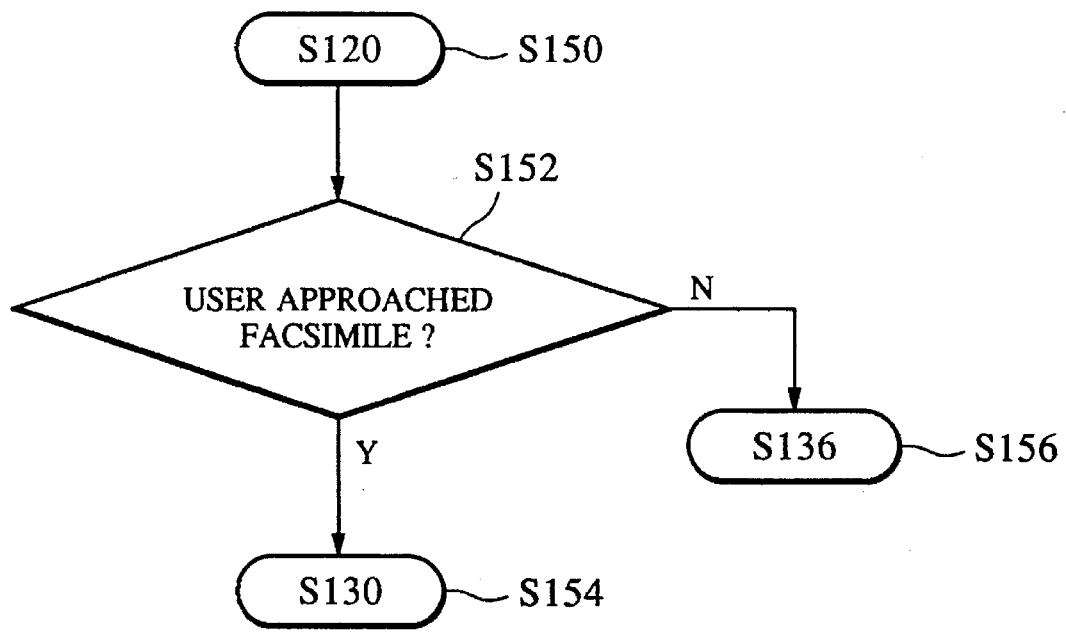
FIG. 6 is a flow chart illustrative of a control process performed in a third embodiment of the present invention.

FIG. 6 illustrates a control process performed in a third embodiment of the present invention. Only portions of the process which are different from corresponding portions of the processes of FIGS. 4 and 5 are shown.

The third embodiment features the use of means for detecting that an operator has approached the facsimile apparatus 1. Namely, the facsimile apparatus automatically starts recording of the picture information stored in the memory when the facsimile apparatus is approached by the operator.

Step S150 in the process shown in FIG. 6 corresponds to Step S120 in the process shown in FIG. 4. Referring to FIG. 6, the control circuit 7 determines in Step S152 whether the operator has approached the facsimile apparatus. If the operator has come near the facsimile apparatus 1, the process proceeds to Step S154, otherwise the process skips to Step S156. Step S154 in the process shown in FIG. 6 corresponds to Step S130 in the process shown in FIG. 4, while Step S156 of the process of FIG. 6 corresponds to Step S136 of the process of FIG. 4.

Figure 7:
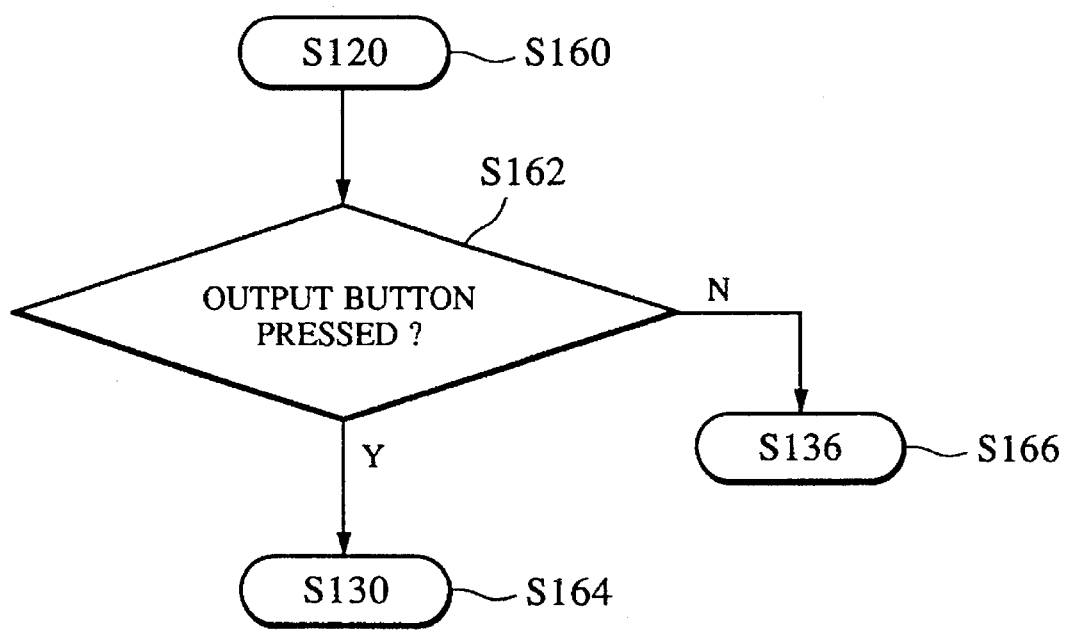
FIG. 7 is a flow chart illustrative of a control process performed in a fourth embodiment of the present invention.

FIG. 7 illustrates a process performed in a fourth embodiment of the present invention. Only the portions of the process different from those of the process shown in FIGS. 4 and 5 are shown in FIG. 7.

In the fourth embodiment, information which has been received and stored in the receiving-end memory circuit 64 is recorded when the output button 14 is pressed down.

Step S160 in the processes shown in FIG. 7 corresponds to Step S120 in FIG. 4. Referring to FIG. 7, the control circuit 7 determines in Step S162 whether the output button 14 is pressed down. If the output button 14 has been pressed, the process proceeds to Step S164, otherwise the process skips to Step S166. Steps S164 and S166 in the process shown in FIG. 6 correspond to Steps S130 and S136 in the process shown in FIG. 4, respectively.

A description will now be given of a fifth embodiment of the present invention. Description of portions of the fifth embodiment which are the same as those of the first embodiment described before is omitted.

Figure 8:
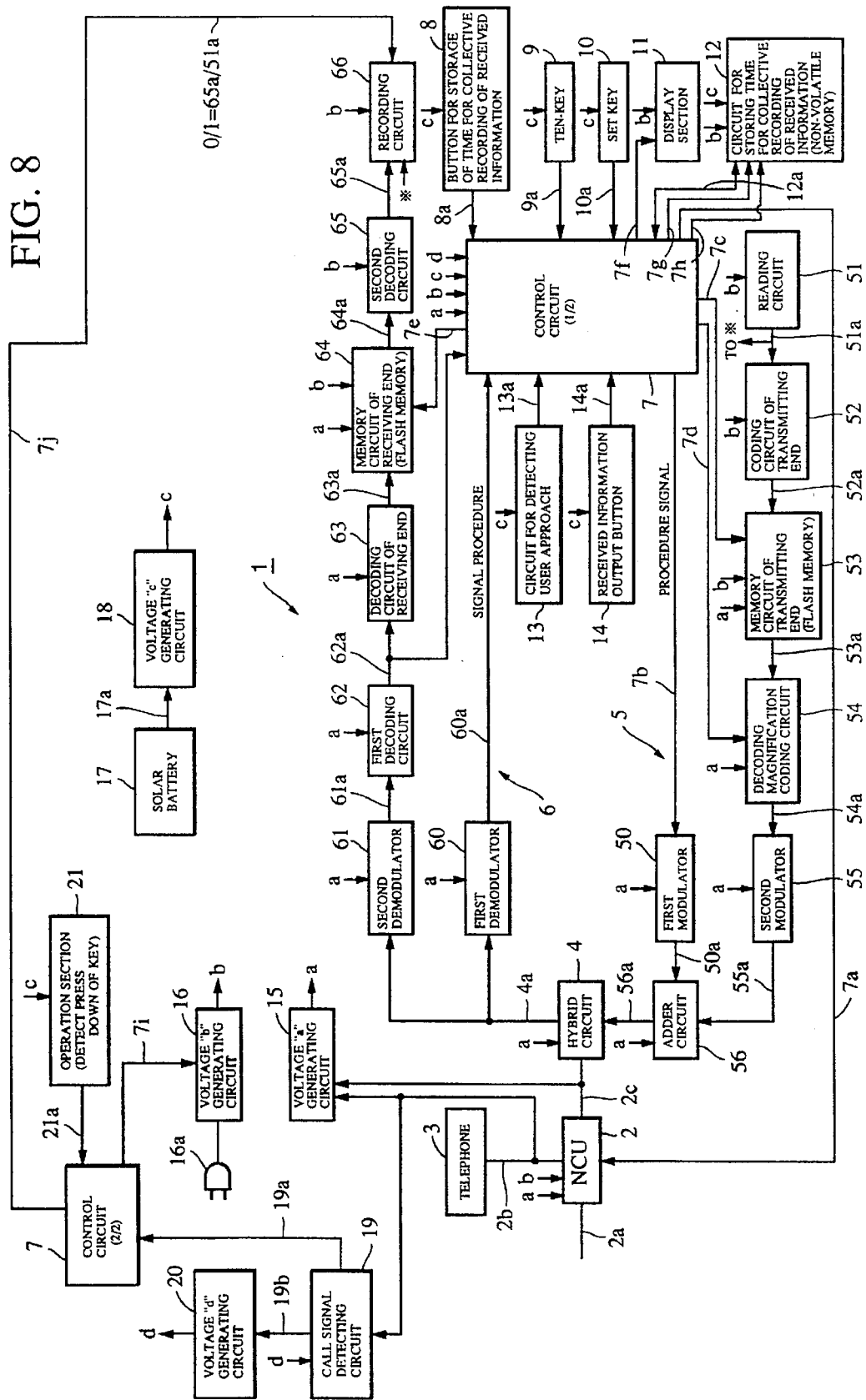
FIG. 8 is a block diagram showing the construction of a fifth embodiment of the facsimile apparatus in accordance with the present invention.

FIG. 8 is a block diagram showing the construction of a facsimile apparatus as a fifth embodiment of the present invention. This facsimile apparatus incorporates an NCU 2 which has the function as the NCU 2 explained before in connection with the first embodiment and an additional function of keeping CML off when NCU is not supplied with a voltage.

The facsimile apparatus 1 of the fifth embodiment has the following components in addition to those incorporated in the first embodiment: a call signal detecting circuit 19; an operation section 21 for detecting that a key has been pressed down, and a voltage "c" generating circuit 18 and a voltage "d" generating circuit 20 which supply electrical power to various components of the facsimile apparatus 1.

When a signal of level "0" exists on a signal line 7j, a recording circuit 66 receives data from a signal line 65a and performs recording of the data successively in a line-by-line fashion, whereas, when a signal of level "1" exists on the signal line 7j, it successively records read information available on a signal line 51a. A storage circuit 12 has a non-volatile memory such as a flash memory which has the same function as that incorporated in the first embodiment.

A voltage "a" generating circuit 15 operates in response to a signal from a signal line 2b or 2c, so as to generate a predetermined voltage "a" from energy possessed by a D.C. voltage supplied through the telephone circuit 2a, and delivers the voltage "a" to various components of the facsimile apparatus 1 including the NCU 2, hybrid circuit 4, control circuit 7, first modulator 50, transmitting-end memory circuit 53, decoding/magnifying/coding circuit 54, second modulator 55, adder circuit 56, first demodulator 60, second demodulator 61, first decoding circuit 62, receiving-end cording circuit 63 and a receiving-end memory circuit 64.

The transmitting-end memory circuit 53 and the receiving-end memory circuit 64 are flash memories which require energy only when information is read from or written in these memories. Namely, the content of these memories are not erased even though no energy is supplied to these memories.

A voltage "b" generating circuit 16 oscillates the switching power supply when a signal of level "1" is available on the signal line 7i, so as to produce a predetermined voltage "b" from the A.C. power supplied through a plug 16a connected to commercial A.C. 100 V power supply, and delivers the voltage "b" to components such as the control circuit 7, display section 11, storage circuit 12, reading circuit 51, transmitting-end coding circuit 52, transmitting-end memory circuit 53, receiving-end memory circuit 64, second decoding circuit 65 and a recording circuit 66.

The storage circuit 12, transmitting-end memory circuit 53 and the receiving-end memory circuit 64 are flash memories which require energy only when information is to be written in or read from these memories. Namely, contents of these memories are never erased even though no electrical power is supplied to these memories.

The switching power supply of the voltage "b" generating circuit does not oscillate and, hence, the voltage "b" is not generated when a signal of level "0" exists on the signal line 7i or when no voltage is supplied thereto.

Numeral 17 designates a solar battery which supplied solar energy to a signal line 17a. The voltage "c" generating circuit 18 generates a predetermined voltage "c" from the solar energy available on the signal line 17a and delivers the voltage "c" to components such as the control circuit 7, storage button 8, ten-key device 9, set key 10, storage circuit 12 and the operation section 21. As explained before, the storage circuit 12 includes a flash memory which requires power only when information is written in or read from this circuit 12. The content of the circuit 12 is maintained even when no power is supplied to this circuit 12.

Numeral 19 designates a circuit for detecting a call signal delivered to the signal line 2b. The circuit 19, when detecting a call signal, delivers a signal of level "1" to the signal line 19a, otherwise it delivers a signal of level "0" to the signal line 19a. At the same time, the circuit 19 delivers the energy derived from the call signal to a signal line 19b.

The voltage "d" generating circuit 20 receives the energy delivered to the signal line 19b and forms a predetermined voltage "d" from the received energy. The circuit 20 supplies this voltage "d" to a signal line 21a. The signal line 21a also receives information as to whether any original exists.

The control circuit performs various kinds of control by using the energy supplied from the solar battery, the energy derived from the telephone circuit and the energy supplied from the A.C. power supply. More specifically, the energy obtained from the solar battery, i.e., the predetermined voltage "c" generated by the voltage "c" generating circuit, is used as the energy which is consumed when pressing down of any key on the facsimile apparats in stand-by condition is detected. Detection of a call signal received by the facsimile apparatus in stand-by condition is performed by using energy supplied through the telephone circuit and possessed by the call signal, i.e., by using the predetermined voltage "d" generated by the voltage "d" generating circuit.

Reading and recording of picture information are conducted by using energy supplied from the A.C. power supply, i . . . , the predetermined voltage "b" generated by the voltage "b" generating circuit. The picture information read by the reading circuit 51 is coded by the transmitting-end coding circuit 52 and is stored in the transmitting-end memory circuit 53. For the purpose of transmitting the picture information stored in the transmitting-end memory circuit 53, CML is turned on to form a D.C. loop, so that the energy supplied through the telephone circuit 2a, i.e., the predetermined voltage "a" generated by the voltage "a" generating circuit becomes available for the transmission of the picture information stored in the transmitting-end memory circuit 53. Similarly, CML is turned on to form a D.C. loop also for the purpose of receiving picture information transmitted to the facsimile apparatus, so that the received information is stored in the receiving-end memory circuit 64. After the received information has been stored in the memory circuit 64, a signal of level "0" is delivered to the signal line 7j, so that the information on the signal line 65a is delivered to the recording circuit 66. The recording circuit 66 performs recording of the information on a recording paper sheet by using energy supplied through the A.C. power supply, i.e., the predetermined voltage "b" generated by the voltage "b" generating circuit.

When a signal of level "1" exists on the signal line 7j, the read information which has been delivered to a signal line 51a is supplied to the recording circuit 66 so that the recording circuit 66 performs copying operation.

The control circuit 7 can operate with any one of the predetermined voltages "a", "b", "c" and "d".

The smallest D.C. voltage energy from the telephone circuit is supplied as power of D.C. 48 V and 20 mA from the exchanger. The total resistance of this D.C. power supply is therefore about 2.4 kΩ. The facsimile apparatus has a resistance of about 200 Ω. Therefore, the electrical power available from the telephone circuit is, at the smallest, $i^2R = 20$ mA·20 mA·200 ohms=800 mw. On the other hand, the power required for transmission is generally on the order of 0 dBm=1 mw. It is therefore possible to perform facsimile transmission by the power derived from the telephone circuit.

In FIG. 8, the control circuit is illustrated as having two sections 1/2 and 2/2, for the purpose of clarification of the drawing. It is to be understood, however, that these two sections are actually consolidated to form a single control circuit 7.

FIGS. 9 to 14 synthetically show the control process performed by the control circuit 7 in the facsimile apparatus shown in FIG. 8.

Figure 9:
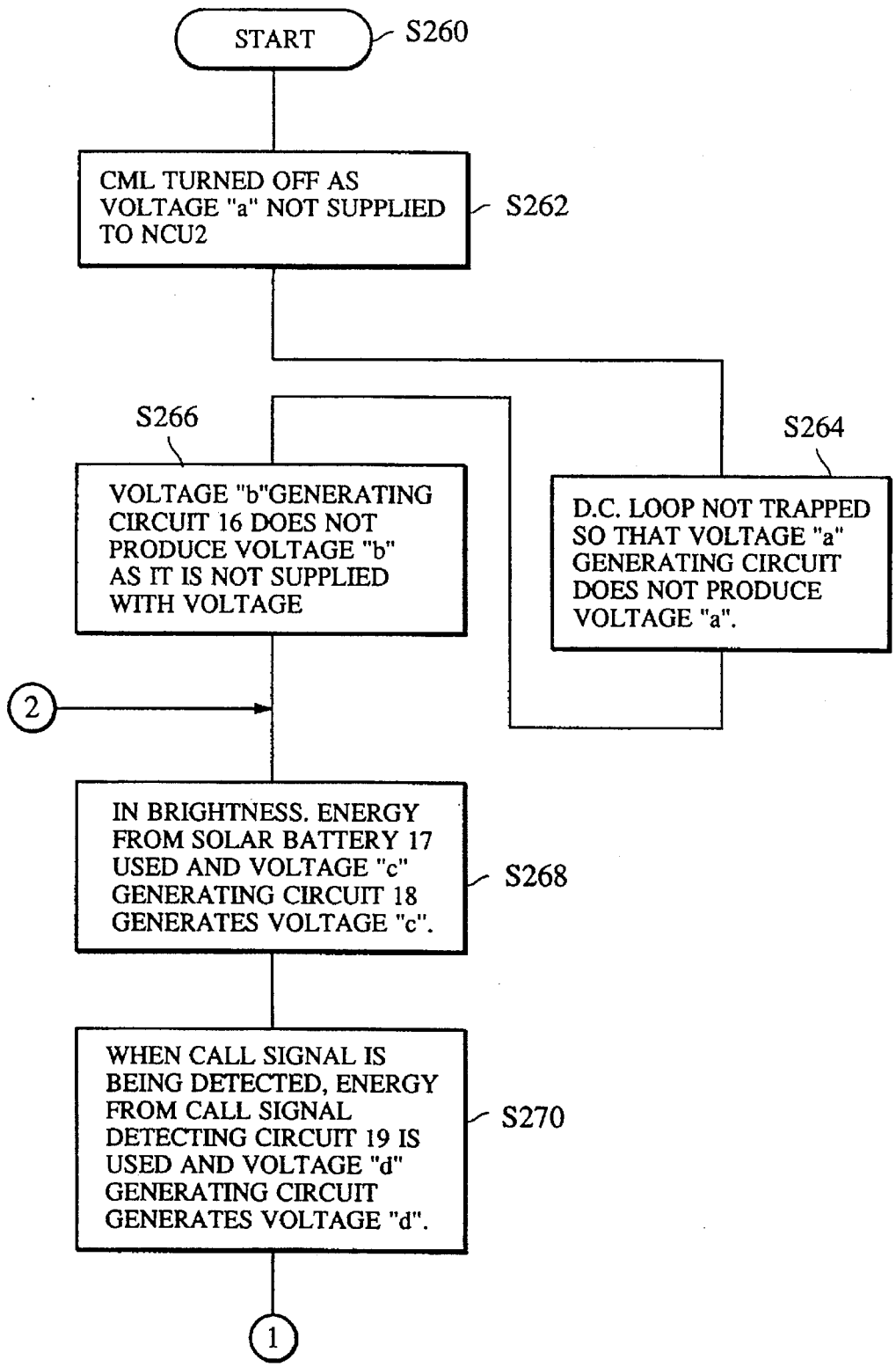
FIG. 9 is a flow chart illustrative of part of a process performed by a control circuit incorporated in the facsimile apparatus shown in FIG. 8.

Referring to FIG. 9, the control process begins at Step S260.

In Step S262, CML is turned off since no voltage is supplied to the NCU 2.

In Step S264, the voltage "a" generating circuit 15 does not produce the predetermined voltage "a" since the D.C. loop has not been formed.

When it is bright around the facsimile apparatus, the voltage "c" generating circuit 18 generates a predetermined voltage "c" by using the energy produced by the solar battery 17. The voltage "c", however, cannot be produced when the light impinging upon the solar battery is insufficient for the power generation. It is to be understood, however, operations of keys on the operation section of the facsimile apparatus is usually conducted when it is bright. Automatic reception of the message can be done even in the brightness because the power required for the receiving is derived from the energy possessed by the call signal coming from the telephone circuit.

In Step S270, the voltage "d" generating circuit 20 generates the predetermined voltage "d" by using energy derived from the call signal detecting circuit 19, on condition that a call signal is being detected.

Based on the information available on the signal line 21a, Step S272 determines whether or not the copy button has been pressed. If this button has been pressed, the process proceeds to Step S274, otherwise the process skips to Step S280. The operation for executing this determination is conducted by the power of the voltage "c".

Step S274 delivers a signal of "1" level to the signal line 7i so as to oscillate the switching power supply thereby producing the predetermined output voltage "b".

In Step S276, a signal of level "1" is delivered to the signal line 7j, so that read information carried by the signal line 51a is successively recorded, thus producing a copy.

In Step S278, a signal of level "0" is delivered to the signal line 7i, so that oscillation of the switching power supply is terminated to stop the generation of the predetermined voltage "b".

Step S280 determines whether or not the transmitting operation has been selected, based on the information on the signal line 21a. When the transmitting operation has been selected, the process proceeds to Step S282, otherwise the process skips to Step S304. The operation for executing this determination is conducted by using the voltage "c".

Step S282 performs the same control as Step S274: namely, it outputs the predetermined voltage "b". Subsequent reading operation os conducted with the predetermined voltage "b".

Step S284 encodes the read information and stores the coded read information in the transmitting-end memory circuit 53.

Step S286 determines whether or not all the pages have been read. If all the pages have been read, the process proceeds to Step S288, otherwise the process returns to Step S284.

Step S288 delivers a signal of level "1" to the signal line 7a so as to turn CML on.

Since CML has been turned on to form a D.C. loop, the voltage "a" generating circuit produces the predetermined voltage "a" in Step S290.

Figure 10:
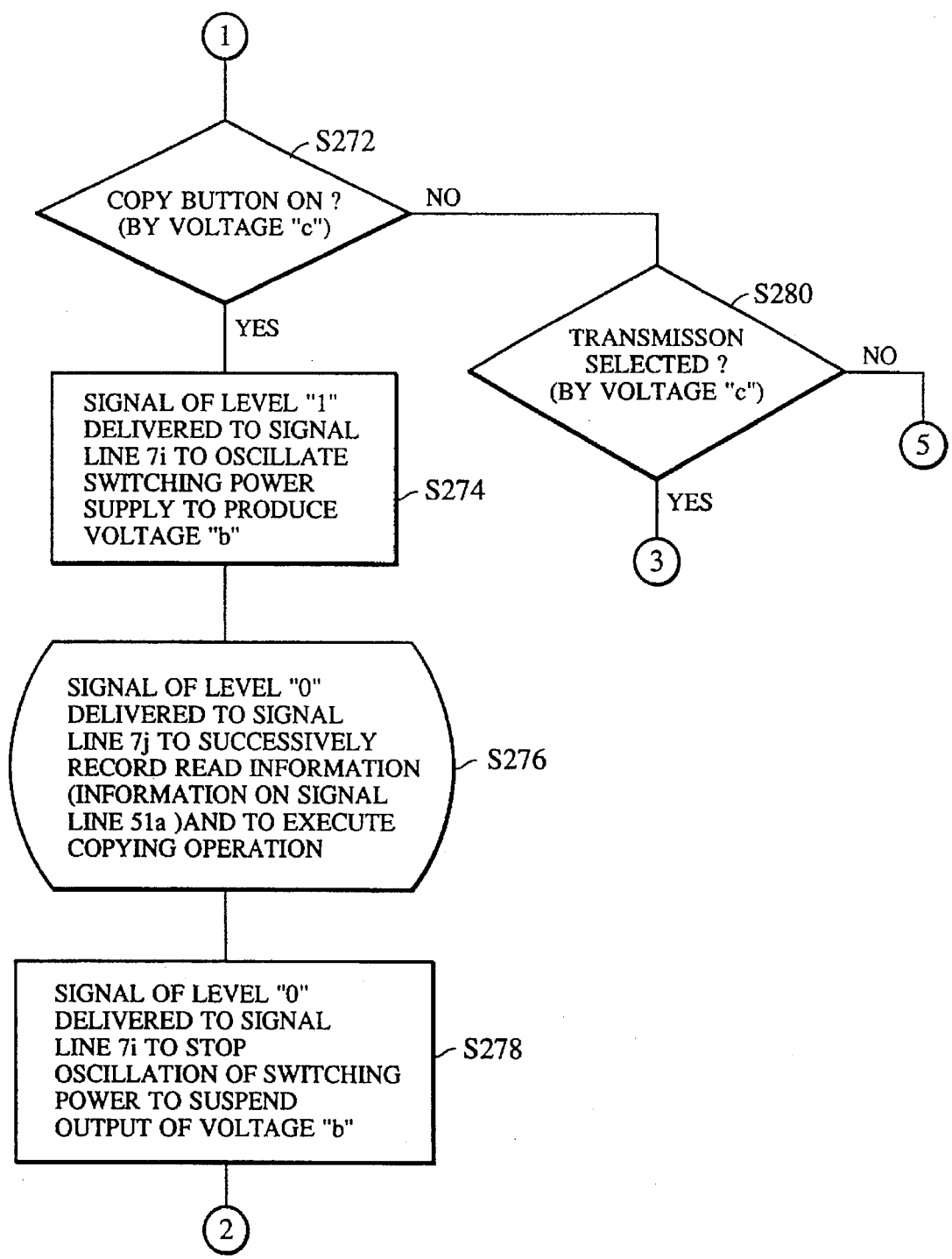
FIG. 10 is a flow chart illustrative of part of a process performed by a control circuit incorporated in the facsimile apparatus shown in FIG. 8.

Step S292 is the same as Step S278 shown in FIG. 10: namely, this Step prohibits delivery of the predetermined voltage "b". Therefore, subsequent communication (memory transmission) is conducted with the predetermined voltage "a".

Step S294 executes a preparatory procedure.

In Step S296, the information stored in the memory circuit 53 is transmitted after execution of magnification/demagnification as required and a subsequent coding.

Step S298 executes a post-procedure.

In Step S300, a signal of "0" level is delivered to the signal line 7a so as to turn CML off.

In Step S302, since CML has been turned off to open the D.C. loop, the voltage "a" generating circuit 15 is kept in stand-by condition without generating the predetermined voltage "a".

In Step S304, information which has been delivered to the signal line 21a is received and determination is done as to whether the receiving mode has been selected. When receiving mode has been selected, the process proceeds to Step S306, otherwise the process skips to Step S330. The determination is conducted by using the voltage "c".

In Step S306, a signal of level "i" is delivered to the signal line 7a so as to turn CML on.

Figure 11:
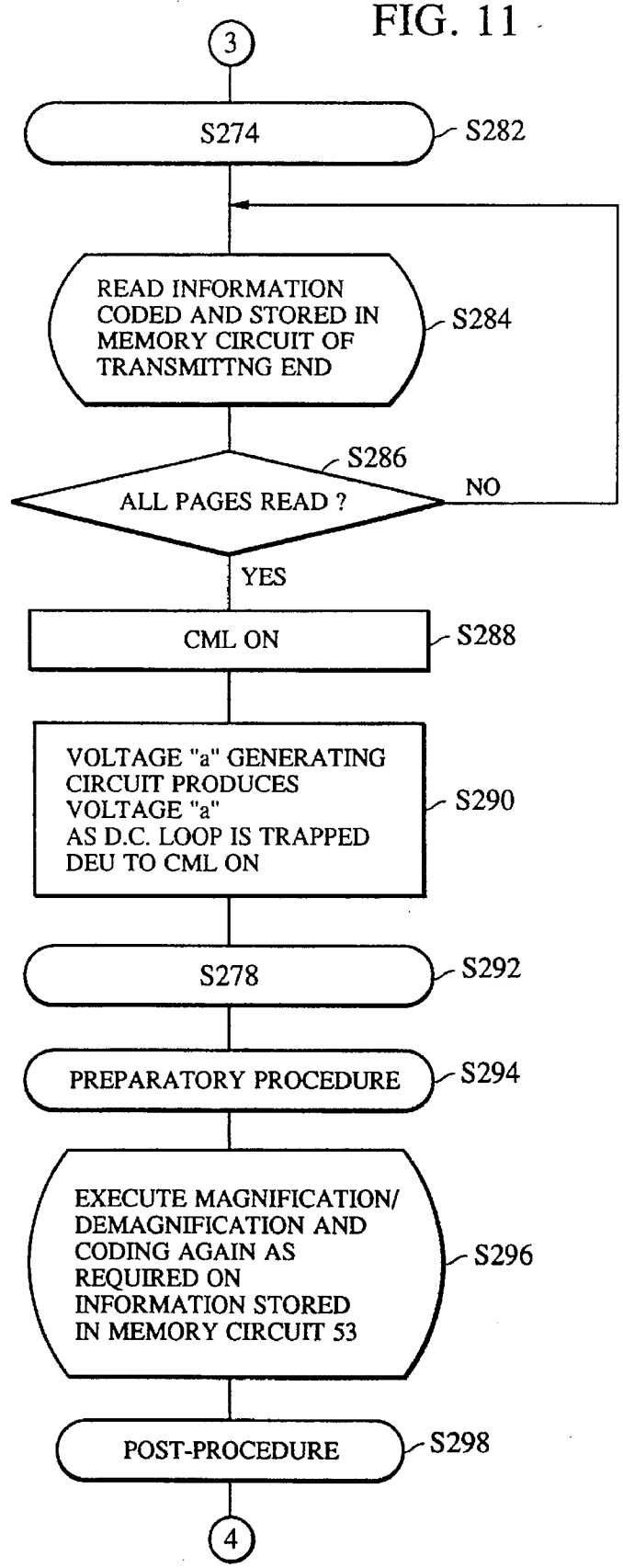
FIG. 11 is a flow chart illustrative of part of a process performed by a control circuit incorporated in the facsimile apparatus shown in FIG. 8.

Step S308 corresponds to Step S290 of FIG. 11. In this Step, since CML has been turned on so as to complete the D.C. loop, the predetermined voltage "a" is outputted.

Step S310 executes preparatory procedure. Subsequent communication (memory receiving) is conducted by using the predetermined voltage "a".

In Step S312, received information is stored in the memory circuit 64.

Step S314 executes post-procedure.

Step S316 performs the same control as Step S274 shown in FIG. 10, thereby outputting the predetermined voltage "b". Subsequent recording of received information is conducted by using the predetermined voltage "b".

Step S318 delivers to the signal line 7a a signal of "0" level so as to turn CML off.

Figure 12:
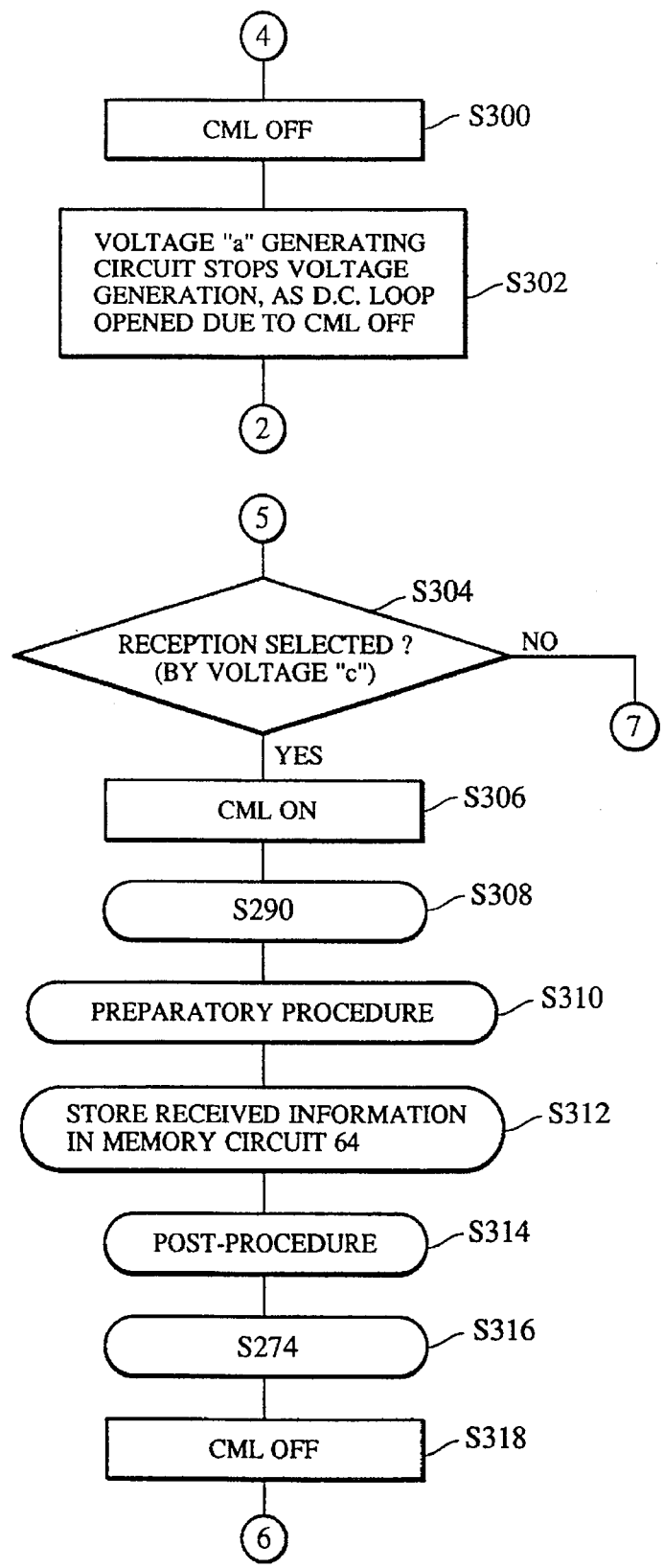
FIG. 12 is a flow chart illustrative of part of a process performed by a control circuit incorporated in the facsimile apparatus shown in FIG. 8.
Figure 13:
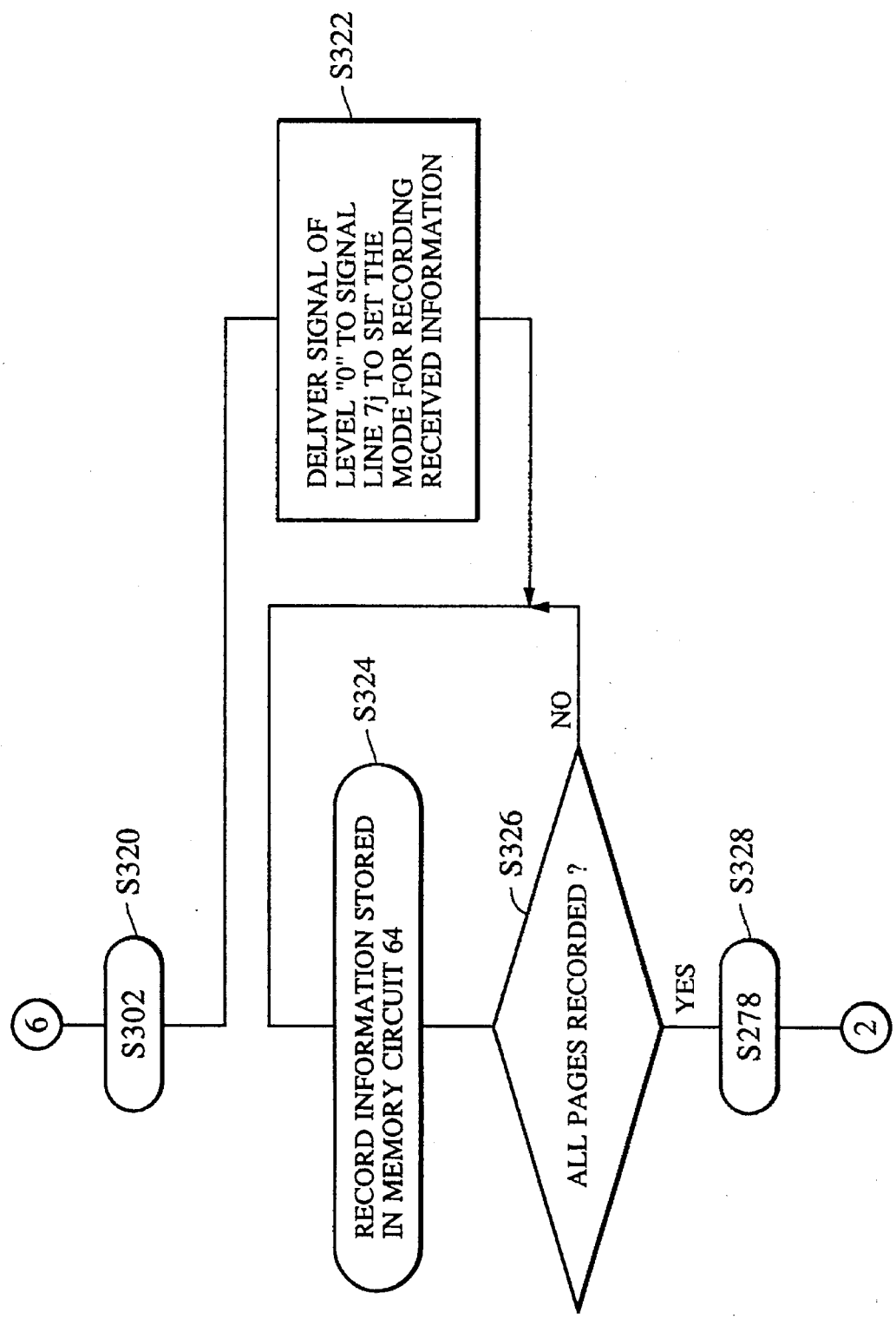
FIG. 13 is a flow chart illustrative of part of a process performed by a control circuit incorporated in the facsimile apparatus shown in FIG. 8.
Figure 14:
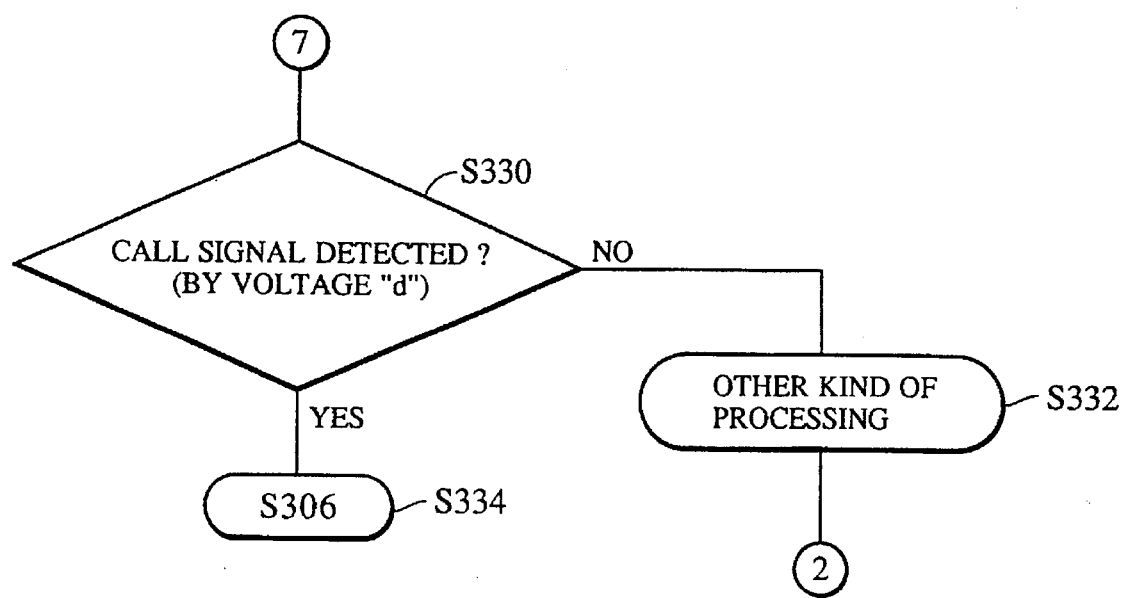
FIG. 14 is a flow chart illustrative of part of a process performed by a control circuit incorporated in the facsimile apparatus shown in FIG. 8.

Step S320 conducts the same operation as Step S302 shown in FIG. 12. Namely, since the D.C. loop has been opened due to turning off of CML, the predetermined voltage "a" is not produced.

Step S322 delivers a signal of level "0" to the signal line 7j so as to set the facsimile apparatus to a mode for recording the received information.

The information recorded in the memory circuit 64 is therefore recorded in Step S324.

Step S326 determines whether or not all the pages of the information have been recorded. If the answer is YES, the process proceeds to Step S328, otherwise the process returns to Step S324.

Step S328 performs the same control as step S278 shown in FIG. 10. Namely, it prohibits the production of the predetermined voltage "b".

Step S330 receives the information carried by the signal line 19a and determines whether or not a call signal has been detected. If a call signal has been detected, the process proceeds to Step S334 which is the same as Step S306 shown in FIG. 12, otherwise the process advances to Step S332 so as to execute other processing. This determination is conducted by using the predetermined voltage "d".

The transmitting-end memory circuit 53, the receiving-end memory circuit 64 and the storage circuit 12 may be flash memories which are non-volatile. When such non-volatile memories are used, transmission of the information stored in the memory can be done by using energy derived from a D.C. loop, even when the A.C. power supply is temporarily turned off after the reading of the original. The formation of the D.C. loop also makes it possible to record the received information by turning the A.C power supply on after elapse of a certain time from the receipt of the information.

Although the invention has been described in its preferred forms, it is to be understood that the described embodiments ar not exclusive and various changes and modifications may be imparted thereto within the scope of the present invention.

As will be understood from the foregoing description, the present invention offers various advantages as follows.

Firstly, it is to be noted that the operation for transmitting picture information and operation for storing the information, which require small electrical power, can be conducted by using energy derived from a low-power power supply such as the energy derived from the telephone circuit, thus realizing a facsimile apparatus which is operable with reduced power consumption.

In a specific form of the invention, the operation for transmitting picture information and operation for storing the information, which require small electrical power, can be conducted by using energy derived from a low-power power supply, while energy-consuming operations such as reading and recording of picture information is conducted by energy derived from high-power power supply, so that the total power consumed by a facsimile apparatus can be reduced.

It is to be understood that a series of operation including reading, storage and recording of picture information can be conducted with appropriate selection of power supplies or types of energy so as to minimize the demand for power.

In a specific form of the invention, when a registered time for recording or printing is reached, all the information stored up to the registered time is printed at once by using energy derived from an A.C. power supply.

In still another specific form of the invention, when a user has approached the facsimile apparatus, all the information stored till then is printed at once by using energy derived from an A.C. power supply.

In a further form of the invention, the recording of stored picture information is not conducted until the operation for recording is selected by the user's will: namely, all the information stored is printed at once by the energy derived from an A.C. power supply when the operator ha selected the mode for executing the printing.

The embodiment described in connection with FIG. 8 offers an advantage in that the manner of supply of energy to the facsimile apparatus in stand-by condition is clarified so that different types of energy sources are suited to different factors of start-up of the facsimile apparatus, thus making it possible to conduct memory transmission and memory receiving with energy derived from a telephone circuit.

The read information is stored in a memory until it is transmitted. The storage of the information is be done without requiring supply of energy. Therefore, whether any factor has arisen for starting the facsimile apparatus can be detected with small energy. Similarly, received information can be stored in a memory without requiring supply of energy. Checking of the factors for starting up the facsimile apparatus from the stand-by condition is therefore conducted with reduced energy.

Two types of energy are available from a telephone circuit: namely, a call signal and D.C. voltage. The invention makes it possible to make adequate and efficient use of these two types of energy for different jobs: namely, for detection of call signal in stand-by condition and for transmission of information stored in a memory circuit and storage of received information in a memory.

What is claimed is:

1. A facsimile apparatus comprising:
   storage means for storing picture information; and
   control means for enabling a first type of operation for transmitting picture information stored in said storage means to an opposite station or a second type of operation for storing picture formation from another station into said storage means, both said first and second types of operations to be conducted by energy supplied through a telephone line from a telephone network to which said facsimile apparatus is connected.

2. A facsimile apparatus according to claim 1, further comprising:
   reading means for reading picture information from an original;
   recording means for recording picture information; and
   conveying means for conveying the original or a recording paper sheet, wherein said control means enables the operation of said reading means for reading the original and the operation of said recording means to be conducted by energy supplied from an external A.C. power supply.

3. A facsimile apparatus according to claim 2, wherein said reading means sends the read picture information to said storage means for storage therein, and said recording means records the picture information stored in said storage means.

4. A facsimile apparatus according to one of claims 2 and 3, further comprising registration means for registering a time at which the picture information is to be recorded, and said control means being operable to activate said recording means so as to record the picture information stored in said storage means when the time registered in said registration means is reached.

5. A facsimile apparatus comprising:
   storage means for storing picture information;
   control means for enabling a first type of operation for transmitting picture information stored in said storage means to an opposite station or a second type of operation for storing picture information from another station into said storage means, both said first and second types of operations to be conducted by energy supplied through a telephone line from a telephone network to which said facsimile apparatus is connected;
   reading means for reading picture information from an original;
   recording means for recording picture information;
   conveying means for conveying the original or a recording paper sheet, wherein said control means enables the operation of said reading means for reading the original or the operation of said recording means to be conducted by energy supplied from an external A.C. power supply; and
   detecting means for detecting approach of an operator to said facsimile apparatus, said control means being operable to activate said recording means so as to record the picture information stored in said storage means when the approach by the operator is detected by said detecting means.

6. A facsimile apparatus according to one of claims 2 and 3, further comprising operation selecting means which enables selection of an operation for outputting image information stored in said storage means, said recording means being responsive to said operation selecting means so as to record the picture information stored in said storage means when said operation for outputting stored information is selected by said operation selecting means.

7. A facsimile apparatus which performs various controls and operations by using energy supplied from a solar battery, energy supplied through a telephone line from a telephone network and energy supplied from an external A.C. power supply, said facsimile apparatus comprising control means for controlling the supply of energy in such a manner that detection of pressing down a key on said facsimile apparatus in standby condition is conducted by using the energy supplied by said solar battery, detection of a call signal arriving at said facsimile apparatus in stand-by condition is conducted by using the energy supplied through the telephone line from the telephone network, transmission of information stored in a memory or storage of received information in said memory is conducted by using the energy supplied through the telephone line from the telephone network, or reading of an original and recording of received information is conducted by using energy supplied from the external A.C. power supply.

8. A facsimile apparatus according to claim 7, wherein the memory for storing information to be transmitted and the memory for storing received information are non-volatile memories.

9. A facsimile apparatus according to claim 7, wherein the detection of the call signal arriving at said facsimile apparatus in stand-by condition is conducted by using energy derived from the call signal supplied through the telephone line from the telephone network, and the transmission of information stored in said memory and storage of received information in said memory are conducted by using energy of D.C. voltage supplied through the telephone line from the telephone network.

10. A facsimile apparatus comprising:
   storage means for storing picture information;
   control means for enabling a first type of operation for transmitting picture information stored in said storage means to an opposite station or a second type of operation for storing picture information from another station into said storage means, both said first and second types of operations to be conducted by energy supplied through a telephone line from a telephone network to which said facsimile apparatus is connected;
   reading means for reading picture information from an original;
   recording means for recording picture information, wherein said reading means sends the read picture information to said storage means for storage therein, and said recording means records the picture information stored in said storage means;
   conveying means for conveying the original and a recording paper sheet, wherein said control means edibles the operation of said reading means for reading the original and the operation of said recording means to be conducted by energy supplied from an external A.C. power supply; and
   detecting means for detecting approach of an operator to said facsimile apparatus, said control means being operable to activate said recording means so as to record the picture information stored in said storage means when the approach by the operator is detected by said detecting means.

11. A method for a facsimile apparatus comprising the steps of:
   storing picture information in storage means of the facsimile apparatus; and
   transmitting the stored picture information to an opposite station or storing picture information from another station in the storage means, using energy supplied through a telephone line from a telephone network to which the facsimile apparatus is connected.

12. A method according to claim 11, further comprising the steps of:
   reading picture information from an original;
   recording picture information; and
   conveying the original or a recording paper sheet, wherein said reading step and said recording step use energy supplied from an external A.C. power supply.

13. A method according to claim 12, wherein said reading step sends the read picture information to the storage means for storage therein, and said recording step records the picture information stored in the storage means.

14. A method according to one of claims 12 and 13, further comprising the step of registering a time at which the picture information is to be recorded, and said recording step records the picture information stored in the storage means when the registered time is reached.

15. A method according to one of claims 12 and 13, further comprising the step of selecting an operation of outputting image information stored in the storage means, said recording step being responsive to said operation selecting step so as to record the picture information stored in the storage means when the operation of outputting stored information is selected in said operation selecting step.

16. A method for a facsimile apparatus comprising the steps of:
   storing picture information in a storage means of the facsimile apparatus;
   transmitting the stored picture information to an opposite station or storing picture information from another station in the storage means, using energy supplied through a telephone line from a telephone network to which the facsimile apparatus is connected;
   reading picture information from an original;
   recording picture information;
   conveying the original and a recording paper sheet, wherein said reading step and said recording step use energy supplied from an external A.C. power supply; and
   detecting approach of an operator to the facsimile apparatus, said recording step recording the picture information stored in the storage means when the approach by the operator is detected in said detecting step.

17. A method for a facsimile apparatus which performs various controls and operations by using energy supplied from a solar battery, energy supplied through a telephone line from a telephone network and energy supplied from an external A.C. power supply, said method comprising the step of controlling the supply of energy so that detection of pressing down a key on the facsimile apparatus in standby condition is conducted by using the energy supplied by the solar battery, detection of a call signal arriving at the facsimile apparatus in stand-by condition is conducted by using the energy supplied through the telephone line from a telephone network, transmission of information stored in a memory and storage of received information in the memory are conducted by using the energy supplied through the telephone line from the telephone network, and reading of an original or recording of received information is conducted by using energy supplied from the external A.C. power supply.

18. A method according to claim 17, wherein the memory for storing information to be transmitted and the memory for storing received information are non-volatile memories.

19. A method according to claim 17, wherein said controlling step further controls the supply of energy so that the detection of the call signal arriving at the facsimile apparatus in stand-by condition is conducted by energy derived from the call signal supplied through the telephone line from the telephone network, and the transmission of information stored in the memory and storage of received information in the memory are conducted by using energy of D.C. voltage supplied through the telephone line from the telephone network.

20. A facsimile method for a facsimile apparatus comprising the steps of:

storing picture information in a storage means of the facsimile apparatus;

transmitting the stored picture information to an opposite station or storing picture information from another station in the storage means, using energy supplied through a telephone line from a telephone network to which the facsimile apparatus is connected;

reading picture information from an original;

recording picture information, wherein said reading step sends the read picture information to the storage means for storage therein, and said recording step records the picture information stored in the storage means;

conveying the original and a recording paper sheet, wherein said reading step and said recording step use energy supplied from an external A.C. power supply; and detecting approach of an operator to the facsimile apparatus, said recording step recording the picture information stored in the storage means when the approach by the operator is detected in said detecting step.

\* \* \* \* \*

UNITED STATES PATENT AND TRADEMARK OFFICE
CERTIFICATE OF CORRECTION

PATENT NO. : 5,659,401

DATED : August 19, 1997

INVENTOR(S): TAKEHIRO YOSHIDA

Page 1 of 2

It is certified that error appears in the above-identified patent and that said Letters Patent is hereby corrected as shown below:

On the drawing
<u>SHEET 4 OF 13</u>
 FIG. 4, "REACHE" should read --REACHED--.

<u>COLUMN 1</u>
 Line 38, "10" should be deleted.

<u>COLUMN 3</u>
 Line 5, "The" should read --In the--;
 Line 10, "10" should be deleted.

<u>COLUMN 4</u>
 Line 21, "(MOdified")  should read --(Modified--.

<u>COLUMN 7</u>
 Line 26, "receiving-ed" should read --receiving-end--;
 Line 45, "conducts deformation" should read --determines--
 Line 63, "And" should read --and--.

<u>COLUMN 9</u>
 Line 62, "apparats" should read --apparatus--.

<u>COLUMN 11</u>
 Line 33, "os" should read --is--.

<u>COLUMN 12</u>
 Line 4, ""i"" should read --"1"--;
 Line 54, "A.C" should read --A.C.--.

UNITED STATES PATENT AND TRADEMARK OFFICE
CERTIFICATE OF CORRECTION

PATENT NO. : 5,659,401

DATED : August 19, 1997

INVENTOR(S): TAKEHIRO YOSHIDA

It is certified that error appears in the above-identified patent and that said Letters Patent is hereby corrected as shown below:

COLUMN 13
Line 13, "operation" should read --operations--;
Line 30, "ha" should read --has--;
Line 63, "formation" should read --information--.

COLUMN 15
Line 40, "edibles" should read --enables--.

Signed and Sealed this

Thirty-first Day of March, 1998

Attest:

BRUCE LEHMAN

Attesting Officer

Commissioner of Patents and Trademarks